United States Patent
Su (10) Patent No.: US 7,663,646 B2
(45) Date of Patent: Feb. 16, 2010

(54) DEVICE, SYSTEM AND METHOD FOR REALIZING ON SCREEN DISPLAY

(75) Inventor: Chi-Chung Su, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 82 days.

(21) Appl. No.: 11/323,268

(22) Filed: Dec. 30, 2005

(65) Prior Publication Data

US 2006/0244763 A1 Nov. 2, 2006

(30) Foreign Application Priority Data

Apr. 28, 2005 (CN) .................. 2005 1 0034478

(51) Int. Cl.
*G09G 5/00* (2006.01)
*H04N 5/50* (2006.01)

(52) U.S. Cl. .............. 345/629; 345/426; 345/589; 348/569; 348/590

(58) Field of Classification Search .............. 345/426, 345/629, 589; 348/569, 590
See application file for complete search history.

(56) References Cited

U.S. PATENT DOCUMENTS

| | | | | |
|---|---|---|---|---|
| 5,325,183 A * | 6/1994 | Rhee | ........................... | 348/578 |
| 6,369,858 B1 * | 4/2002 | Lee | ........................... | 348/569 |
| 6,529,244 B1 * | 3/2003 | Hrusecky | ........................... | 348/453 |
| 6,642,934 B2 * | 11/2003 | Hrusecky et al. | ........................... | 345/629 |
| 6,741,224 B2 * | 5/2004 | Lee | ........................... | 345/20 |
| 6,747,688 B1 * | 6/2004 | Kang | ........................... | 348/182 |
| 6,829,015 B2 * | 12/2004 | Kwon | ........................... | 348/569 |
| 7,324,158 B2 * | 1/2008 | Lin | ........................... | 348/448 |
| 2005/0134737 A1 * | 6/2005 | Honma | ........................... | 348/569 |
| 2006/0092188 A1 * | 5/2006 | Mamba et al. | ........................... | 345/698 |
| 2007/0065093 A1 * | 3/2007 | Takatori et al. | ........................... | 386/46 |
| 2008/0303948 A1 * | 12/2008 | Honma | ........................... | 348/569 |

FOREIGN PATENT DOCUMENTS

CN 1186954 C 1/2005

* cited by examiner

*Primary Examiner*—M Good Johnson
(74) *Attorney, Agent, or Firm*—Wei Te Chung (57) ABSTRACT

A device for realizing on screen display (OSD) in video signals includes a comparator (430) and an outputting control unit (440). The comparator (430) is used for receiving OSD signals and identification signals on a background color selected to be transparent in the OSD signals, identifying the background color in the OSD signals based on the identification signals, and generating a control signal based on the identification. The outputting control unit (440) is connected to the comparator (430), and is used for receiving UV components of the OSD signals, UV components of the video signals, and the control signal, and for selectively outputting UV data of the video signals or UV data of the OSD signals according to the control signal. The device simulates translucent OSD by preparing the Y and UV components of displayable YUV signals respectively from the video signals and the OSD signals.

22 Claims, 5 Drawing Sheets

DEVICE, SYSTEM AND METHOD FOR REALIZING ON SCREEN DISPLAY

BACKGROUND OF THE INVENTION

1. Field of the Invention

The present invention relates to devices, systems and methods for processing images, and particularly to a device, system and method for realizing on screen display (OSD) translucency.

2. Related Art

On screen display (OSD) technology is widely used in image processing devices such as TVs (televisions), PCs (personal computers), and mobile terminals. The OSD displays additional information such as a channel selection and display time of the image processing device.

Figure 5:
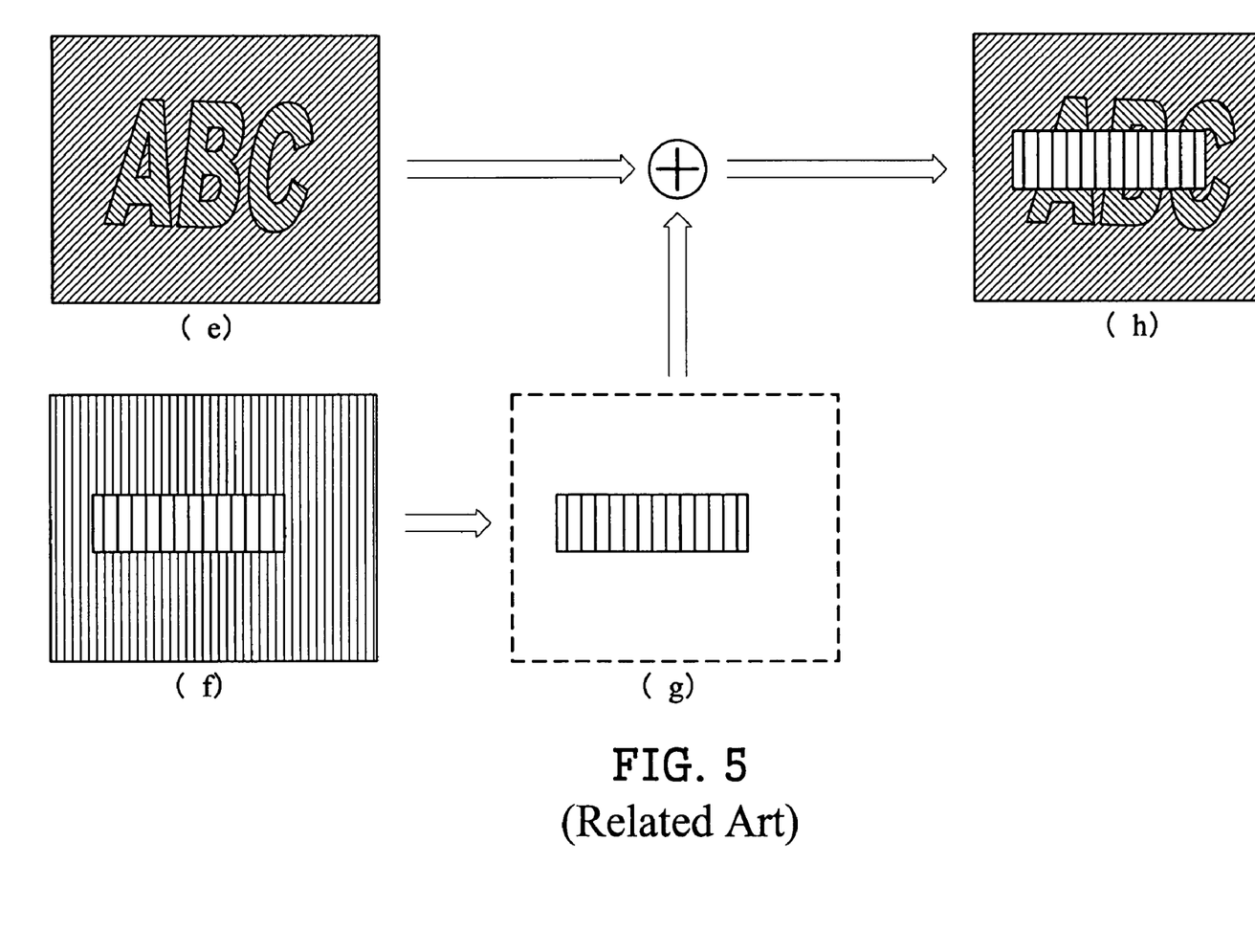
FIG. 5 schematically illustrates an exemplary image display and precursors thereof when OSD signals are blended with video signals according to conventional techniques.

However, conventional OSD techniques have a shortcoming in that the OSD partially covers images being shown on the screen of the image processing device. Referring to FIG. 5, image (e) schematically illustrates an original image of an image processing device, and image (f) schematically illustrates an OSD image. Image (g) shows the OSD image without a background color. When the OSD image and the original image are combined as shown in image (h), the OSD image partially covers the original image, which can significantly mar the appearance of the original image.

If the OSD image is made translucent, the above-described problem is readily solved. Viewers can see both the OSD image and the original image simultaneously.

A typical system and method for realizing OSD translucency generally adopts alpha blending theory that complies with the RGB (red green blue) standard. The alpha blending theory is a process of combining a foreground RGB color with a background RGB color, and then producing a new blended RGB color. That is, RGB data of the OSD signals and RGB data of the video signals are alpha blended to realize the OSD translucency. Formulas that describe the alpha blending theory are as follows:

$$\begin{cases} \text{Blended-red} = \text{Foreground-red} * \text{alpha} + \text{Background-red} * (1 - \text{alpha}) \\ \text{Blended-green} = \text{Foreground-green} * \text{alpha} + \text{Background-green} * (1 - \text{alpha}) \\ \text{Blended-blue} = \text{Foreground-blue} * \text{alpha} + \text{Background-blue} * (1 - \text{alpha}) \end{cases}$$

wherein alpha is a parameter, and alpha values are in the range from 0 to 1; the RGB data of the OSD signals are respectively represented as foreground-red, foreground-green, and foreground-blue; and the RGB data of the video signals are respectively represented as background-red, background-green, and background-blue. Different translucency effects are realized by selecting different alpha values. However, the alpha blending process needs a multiplication device with a complicated operation.

Further, for many image processing devices, image signals are generally processed or transmitted based on the YUV standard. The YUV (YCrCb) standard is a color encoding standard that is used worldwide as a television broadcasting standard. Y signals stand for a luminance component. U signals and V signals stand for chrominance components. One advantage of the YUV standard is that signals can be easily manipulated to selectively discard some information and thereby reduce transmission bandwidth. However, the above-described conventional method for realizing OSD translucency adopts the alpha blending theory, which is based on the RGB standard. Therefore, in order to utilize the OSD translucency method, video signals and OSD signals that comply with the YUV standard must be changed to signals that comply with the RGB standard. The change can result in image display error.

Therefore, a heretofore unaddressed need exists in the industry to overcome the aforementioned deficiencies and inadequacies.

SUMMARY

A device for realizing OSD translucency in video signals according to an exemplary embodiment of the present invention includes a comparator and an output control unit. The comparator is used for receiving OSD signals and identification signals on a background color selected to be transparent in the OSD signals, identifying the background color in the OSD signals based on the identification signals, and generating a control signal based on the identification. The output control unit is connected to the comparator. The output control unit is used for receiving UV components of the OSD signals, UV components of the video signals, and the control signal, and for selectively outputting UV data of the video signals or UV data of the OSD signals according to the control signal. If the background color in the OSD signals is the same as the identification signals, the UV data of the video signals instead of the corresponding UV data of the OSD signals are output; and if the background color in the OSD signals is different from the identification signals, the UV data of the OSD signals are output.

A system for realizing OSD translucency in video signals according to an exemplary embodiment of the present invention includes a video signal receiver, an OSD signal receiver, an OSD transparent identification unit, a comparator, and an output control unit. The video signal receiver is used for receiving the video signals. The OSD signal receiver is used for receiving OSD signals. The OSD transparent identification unit is used for receiving identification signals on a background color selected to be transparent in the OSD signals. The comparator is connected to the OSD signal receiver and the OSD transparent identification unit. The comparator is used for receiving the OSD signals and the identification signals, identifying the background color in the OSD signals based on the identification signals, and generating a control signal based on the identification. The output control unit is connected to the video signal receiver, the OSD signal receiver and the comparator. The output control unit is used for receiving UV components of the OSD signals, UV components of the video signals, and the control signal, and for selectively outputting UV data of the video signals or UV data of the OSD signals according to the control signal. If the background color in the OSD signals is the same as the identification signals, the UV data of the video signals instead of the corresponding UV data of the OSD signals are output; and if the background color in the OSD signals is different from the identification signals, the UV data of the OSD signals are output.

A method for realizing OSD translucency in video signals according to an exemplary embodiment of the present invention includes the steps of: receiving video signals and OSD signals; receiving identification signals on a background color selected to be transparent in the OSD signals; identifying the background color in the OSD signals based on the identification signals; and outputting UV data of the video signals instead of corresponding UV data of the OSD signals if the background color in the OSD signals is the same as the identification signals; or outputting UV data of the OSD signals if the background color in the OSD signals is different from the identification signals.

By employing the above-described device, system and method, OSD translucency in video signals can be efficiently realized through simple operations.

Other advantages and novel features will be drawn from the following detailed description when considered with the attached drawings, in which:

DETAILED DESCRIPTION OF PREFERRED EMBODIMENTS

Figure 1:
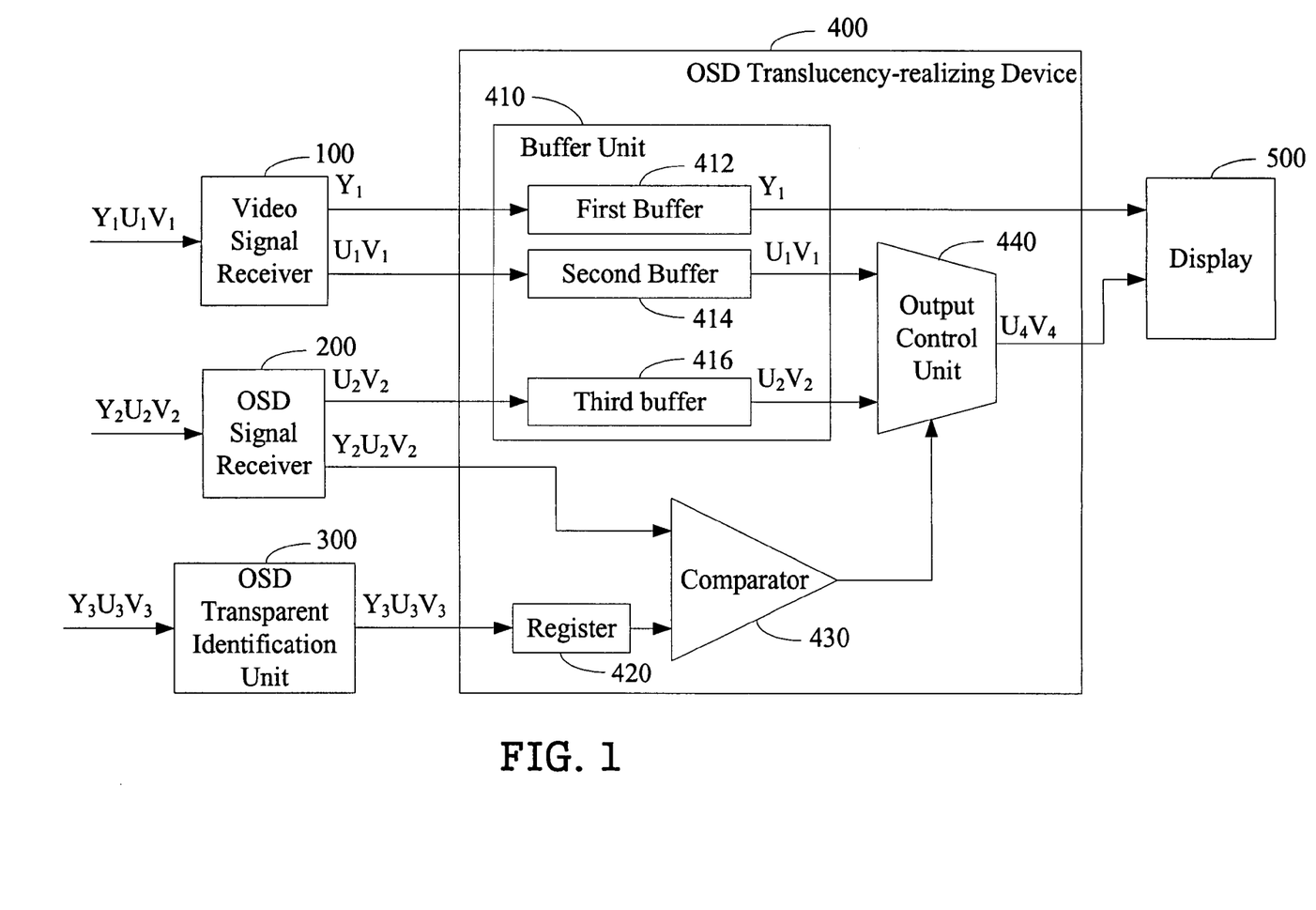
FIG. 1 is a block diagram of a system for realizing OSD translucency in video signals according to an exemplary embodiment of the present invention.

FIG. 1 shows a block diagram of a system for realizing OSD translucency according to an exemplary embodiment of the present invention. In the exemplary embodiment, the system includes a video signal receiver 100, an OSD signal receiver 200, an OSD transparent identification unit 300, an OSD translucency-realizing device 400, and a display 500. The OSD translucency-realizing device 400 includes a buffer unit 410, a register 420, a comparator 430, and an output control unit 440. In the exemplary embodiment, the buffer unit 410 includes a first buffer 412, a second buffer 414, and a third buffer 416.

Figure 2:
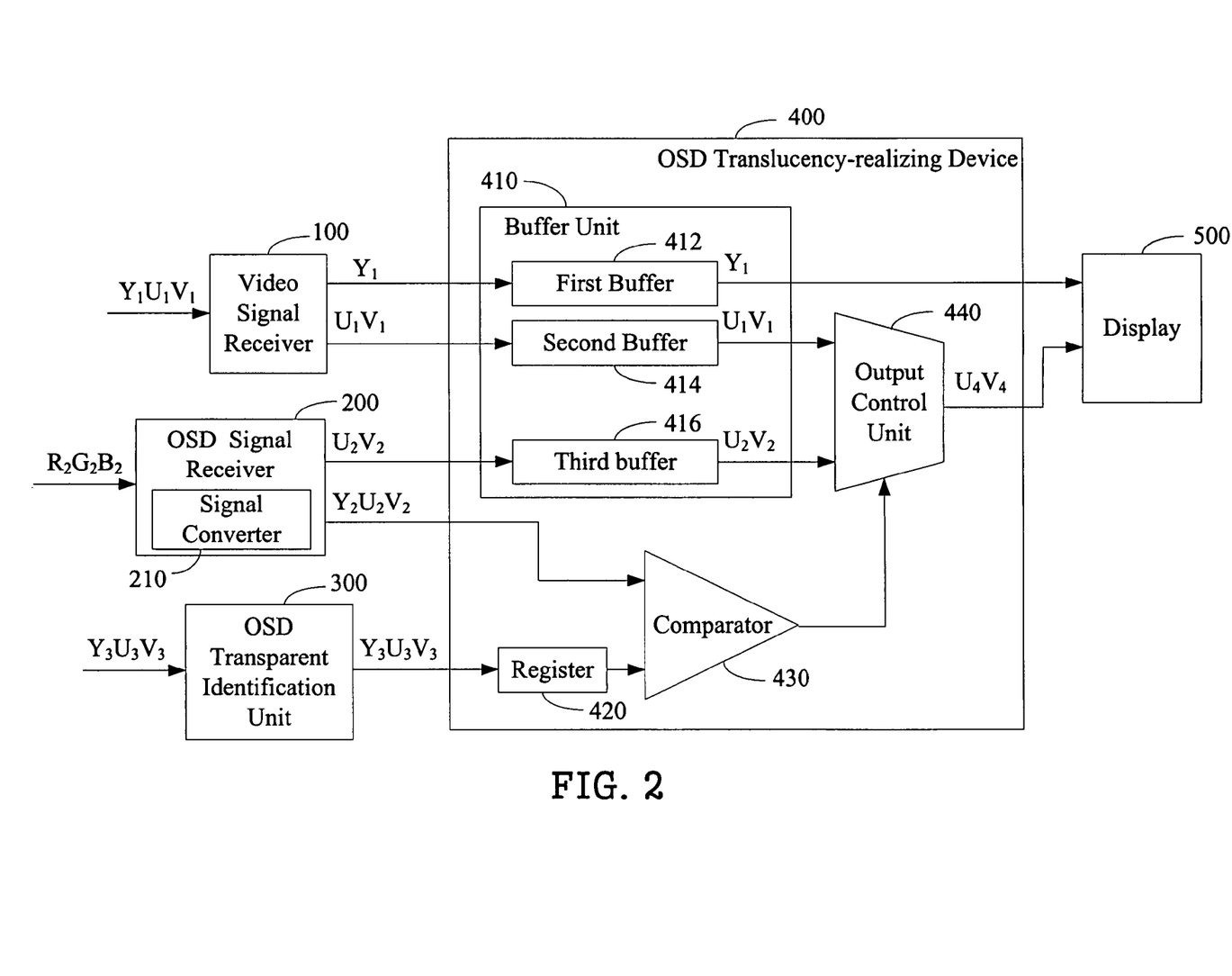
FIG. 2 is a block diagram of a system for realizing OSD translucency in video signals according to another exemplary embodiment of the present invention.

The video signal receiver 100 is used for receiving video signals $Y_1U_1V_1$, and for outputting the $Y_1U_1V_1$ signals to the buffer unit 410. The $Y_1$ component of the $Y_1U_1V_1$ signals is transmitted to the first buffer 412, and the $U_1V_1$ components of the $Y_1U_1V_1$ signals are transmitted to the second buffer 414. The OSD signal receiver 200 is used for receiving OSD signals. In the exemplary embodiment, the OSD signals are $Y_2U_2V_2$ signals. The OSD signal receiver 200 outputs the $Y_2U_2V_2$ signals to the OSD translucency-realizing device 400. In particular, the $U_2V_2$ components of the $Y_2U_2V_2$ signals are transmitted to the third buffer 416, and the $Y_2U_2V_2$ signals are transmitted to the comparator 430. In the exemplary embodiment, signals received by the video signal receiver 100 and the OSD receiver 200 are all compliant with the YUV standard. Referring to FIG. 2, in another embodiment, if signals received by the OSD receiver 200 are not compliant with the YUV standard but instead compliant with the RGB standard, a signal converter 210 in the OSD signal receiver 200 is provided for converting the RGB standard signals $R_2G_2B_2$ to YUV standard signals $Y_2U_2V_2$. An operation formula for converting RGB data to YUV data is as follows:

$$\begin{cases} V = (0.439*R) - (0.368*G) - (0.071*B) + 128 \\ U = -(0.148*R) - (0.291*G) + (0.493*B) + 128 \end{cases}$$

In the exemplary embodiment, the OSD transparent identification unit 300 is used for receiving identification signals $Y_3U_3V_3$ on a background color selected to be transparent in the OSD signals $Y_2U_2V_2$. That is, the OSD signals $Y_2U_2V_2$ have identification signals $Y_3U_3V_3$ that are to be transparent. The register 420 is connected to the OSD transparent identification unit 300, and is used for storing the identification signals $Y_3U_3V_3$. The comparator 430 is connected to the OSD signal receiver 200 and the register 420. The comparator 430 is used for receiving the OSD signals $Y_2U_2V_2$ and the identification signals $Y_3U_3V_3$, for identifying the background color in the OSD signals $Y_2U_2V_2$ based on the corresponding identification signals $Y_3U_3V_3$, and for generating and outputting a control signal based on the identification. The first buffer 412 is connected between the video signal receiver 100 and the display 500, and is used for storing $Y_1$ data of the video signals $Y_1U_1V_1$. The second buffer 414 is connected between the video signal receiver 100 and the output control unit 440, and is used for storing $U_1V_1$ data of the video signals $Y_1U_1V_1$. The third buffer 416 is connected between the OSD signal receiver 200 and the output control unit 440, and is used for storing $U_2V_2$ data of the OSD signals $Y_2U_2V_2$. The output control unit 440 is also connected to the comparator 430. The output control unit 440 is used for receiving the control signal, and for selectively outputting the $U_1V_1$ data of the video signals $Y_1U_1V_1$ or the $U_2V_2$ data of the OSD signals $Y_2U_2V_2$ according to the control signal. In the exemplary embodiment, if the background color in the OSD signals $Y_2U_2V_2$ is same as the identification signals $Y_3U_3V_3$, the output control unit 440 outputs the $U_1V_1$ data of the video signals $Y_1U_1V_1$ instead of the corresponding $U_2V_2$ data of the OSD signals $Y_2U_2V_2$; and if the background color in the OSD signals $Y_2U_2V_2$ is different from the identification signals $Y_3U_3V_3$, the output control unit 440 outputs the $U_2V_2$ data of the OSD signals $Y_2U_2V_2$. The output UV data are designated as $U_4V_4$. The display 500 is connected to the first buffer 412 and the output control unit 440, and is used for blending the $U_4V_4$ data and the $Y_1$ data of the video signals $Y_1U_1V_1$, and for displaying blended $Y_1U_4V_4$ signals.

Figure 3:
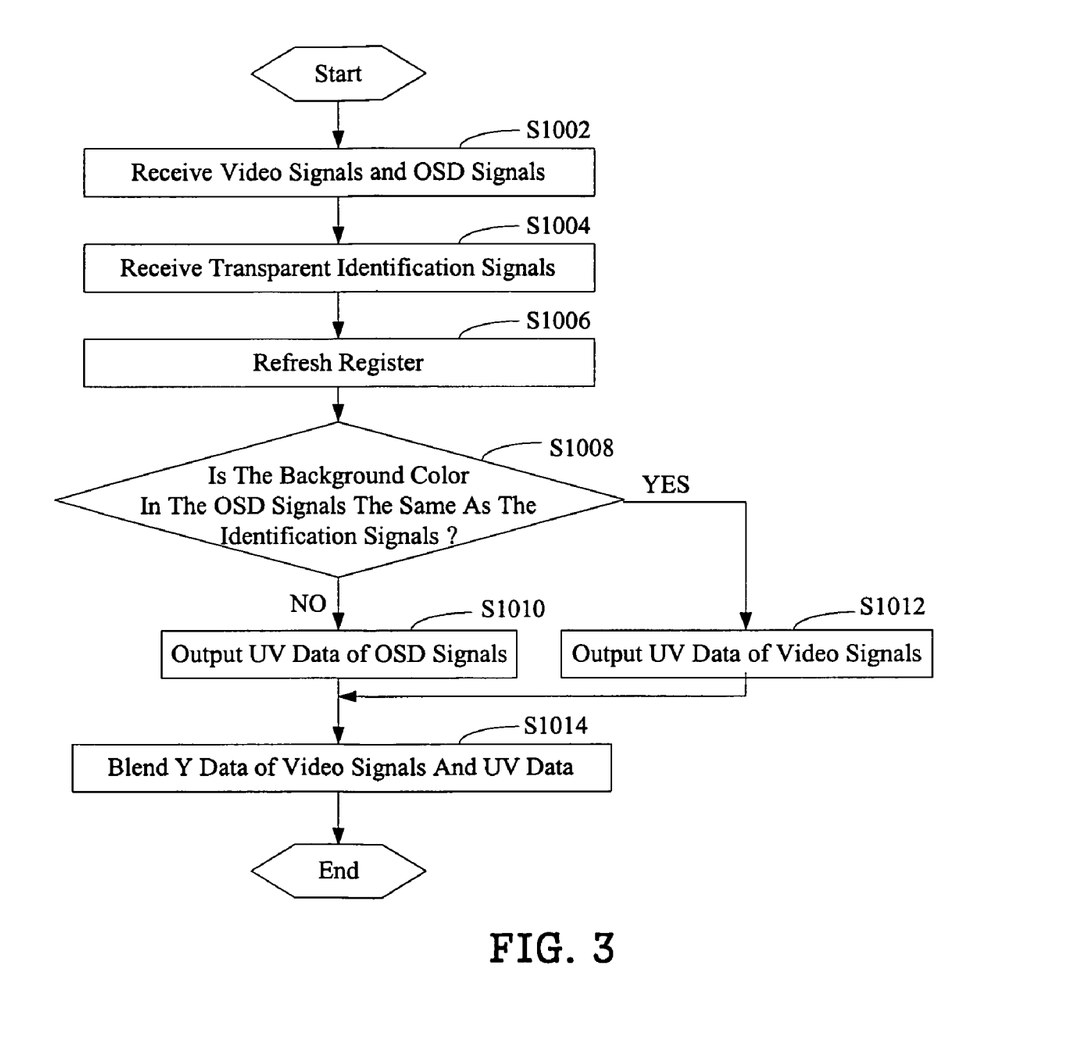
FIG. 3 is a flow chart of a method for realizing OSD translucency in video signals according to still another exemplary embodiment of the present invention.

FIG. 3 is a flow chart of a method for realizing on screen display (OSD) translucency in video signals according to the exemplary embodiment of the present invention. At step S1002, the buffer unit 410 receives video signals and OSD signals. In the exemplary embodiment, the received video signals and the received OSD signals are all compliant with the YUV standard. In another embodiment, if the received OSD signals are compliant with the RGB standard, as shown in FIG. 2, the signal converter 210 in the OSD signal receiver 200 converts the RGB standard OSD signals to YUV standard OSD signals. At step S1004, the OSD transparent identification unit 300 receives identification signals on a background color selected to be transparent in the OSD signals. At step S1006, the identification signals are stored in the register 420, and the register 420 updates the identification signals transmitted from the OSD transparent identification unit 300 immediately. At step S1008, the comparator 430 identifies the background color in the OSD signals, and determines whether the background color in the OSD signals is the same as the identification signals. If the background color in the OSD signals is different from the identification signals, at step S1010, the output control unit 440 outputs the UV data of the OSD signals. If the background color in the OSD signals is the same as the identification signals, at step S1012, the output control unit 440 outputs the UV data of the video signals. At the last step S1014, the display 500 blends the Y data of the video signals and the UV data transmitted from the output control unit 440, and displays the blended YUV signals.

Figure 4:
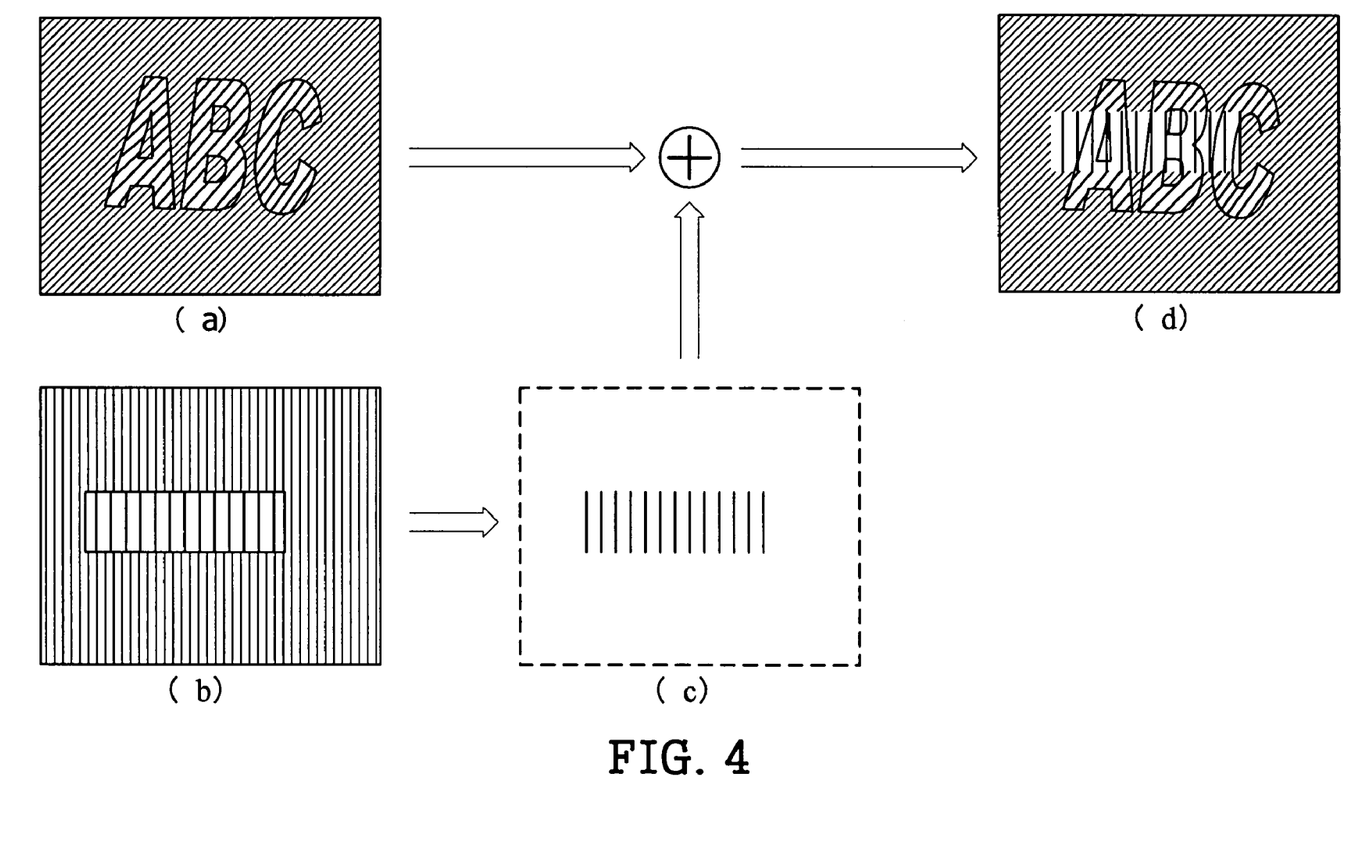
FIG. 4 schematically illustrates an exemplary image display and precursors thereof when an OSD translucency function is implemented according to any of the exemplary embodiments of the present invention.

FIG. 4 schematically illustrates an exemplary image display and precursors thereof when an OSD translucency function is implemented according to any of the above-described exemplary embodiments of the present invention. Inage (a) schematically illustrates a video image which is formed with video signals, and image (b) schematically illustrates an OSD image which is formed with OSD signals. At first, the OSD signals of the OSD image are processed by the comparator 430. Y data of the OSD signals and the background color in the OSD signals that is same as the identification signals are eliminated, as shown in image (c). Subsequently, the Y data of the video signals and the UV data selected by the output control unit 440 are blended and displayed, as shown in image (d).

Although only exemplary embodiments have been described in detail above, those skilled in the art will readily appreciate that many modifications to the exemplary embodiments are possible without materially departing from the novel teachings and advantages of the present invention. Accordingly, all such modifications are deemed to be covered by the following claims and allowable equivalents of the claims.

I claim:

1. A method for realizing on-screen display (OSD), implemented in a device capable of showing OSD that comprises a video signal receiver, an OSD signal receiver, and an output control unit, comprising:
    retrieving by the video signal receiver a first presenting part of video signals to be viewable on a display of the device capable of showing OSD and a second presenting part of said video signals other than said first part, wherein the first presenting part and the second presenting part of said video signals comprise three essential color space elements of the video signals;
    retrieving by the OSD signal receiver a second presenting part of on-screen-display (OSD) signals corresponding to said second part of said video signals, wherein a first presenting part and the second presenting part of said OSD signals comprise three essential color space elements of the OSD signals;
    selectively transmitting by the output control unit said retrieved second part of said video signals or said retrieved second part of said OSD signals for display; and
    displaying by the device capable of showing OSD a set of combinative viewable signals on said display by preparing first and second presenting parts of the set of combinative viewable signals respectively from said retrieved first part of said video signals and said selectively-transmitted second part of one of said video signals and said OSD signals, wherein said retrieved first part of said video signals, said retrieved second part of said video signals and said retrieved second part of said OSD signals are respectively stored in three different buffers before further processing.

2. The method as recited in claim 1, wherein said video signals and OSD signals are presented under a YUV standard, said first part is a Y component of presentation under said YUV standard, and said second part is a UV component of said presentation under said YUV standard.

3. The method as recited in claim 2, further comprising converting available OSD signals presented under an RGB (red green blue) standard to said OSD signals presented under said YUV standard.

4. The method as recited in claim 1, further comprising retrieving identification signals to be compared with said OSD signals, and the second part of the OSD signals is provided to be processed with said video signals based on the comparison of said OSD signals and said identification signals.

5. A system for realizing on screen display (OSD) in video signals, connectable to a display requiring input signals in a format having chrominance and luminance components, comprising:
    a video signal receiver for receiving video signals of a video image;
    an OSD signal receiver for receiving OSD signals of an OSD image;
    a control signal generator connected to the OSD signal receiver, generating a control signal indicative of the existence of a to-be-displayed portion of the OSD image; and
    an output control unit connected to the video signal receiver, the OSD signal receiver, and the control signal generator, for receiving chrominance components of the OSD signals, chrominance components of the video signals, and the control signal, and for selectively outputting chrominance data of the video signals or chrominance data of the OSD signals according to the control signal;
    wherein the output of the output control unit and luminance data of the video signals are provided to the display to respectively serve as the chrominance and luminance components of the input signals, and if the OSD signal belongs to the to-be-displayed portion of the OSD image, the chrominance data of the OSD signals are output by the output control unit, the output control unit facilitates the to-be-displayed portion of the OSD image to be partially displayed in chrominance aspects on the display while allowing the video signals to be partially displayed in luminance aspects at the to-be-displayed portion of the OSD image, wherein the luminance component and the chrominance components of the video signals are split into two different paths after being output by the video signal receiver, one of the two different paths comprises a first buffer and connection associating the first buffer with the display, and the other of the two different paths comprises a second buffer and connection associating the second buffer with the output control unit.

6. The system as recited in claim 5, wherein luminance and chrominance data of the video signals and the OSD signals are respectively Y and UV data thereof in YUV standard, further comprising:
    the display connected to the video signal receiver and the output control unit, the display requiring input signals in a YUV format for display, receiving Y data of the video signals as the Y component of the input signals and the UV data transmitted from the output control unit as the UV component of the input signals, and displaying the input signals.

7. The system as recited in claim 6, wherein the first buffer connected between the video signal receiver and the display for storing the Y data of the video signals.

8. The system as recited in claim 5, wherein the OSD signal receiver comprises a signal converter for converting received RGB (red green blue) signals of the OSD signals to YUV signals.

9. The system as recited in claim 5, wherein the second buffer connected between the video signal receiver and the output control unit for storing the chrominance data of the video signals.

10. The system as recited in claim 5, further comprising a buffer connected between the OSD signal receiver and the output control unit for storing the chrominance data of the OSD signals.

11. The system as recited in claim 5, wherein the control signal generator comprises a comparator for receiving the OSD signals and identification signals, identifying the background color in the OSD signals based on the identification signals, and generating the control signal based on the identification.

12. The system as recited in claim 5, wherein the luminance data of the video signals and the output of the output control unit are provided to the display to respectively serve as the luminance and chrominance components of the set of the input signals.

13. The system as recited in claim 5, wherein the chrominance components of the OSD signals and the entirety of the OSD signals comprising the chrominance and a luminance component are separately transmitted to a third buffer and a comparator before the chrominance components of the OSD signals are output by the output control unit and serve as the chrominance components of the input signals.

14. A method for realizing on screen display (OSD) in video signals, implemented in a device capable of showing OSD, the method comprising:

receiving by the device, video signals with three components and OSD signals with three components, wherein the three components of the video signals comprise one luminance component and two chrominance components, and the three components of the OSD signals comprise one luminance component and two chrominance components;

retrieving by the device, luminance and chrominance components of the video signals and luminance and chrominance components of the OSD signals;

replacing by the device the luminance component of the OSD signals by the luminance component of the video signals before the OSD signals are displayed by a display of the device capable of showing OSD, such that the luminance component of video signals and the chrominance components of the OSD signals collaboratively form three components of processed signals; and outputting by the device the three components of the processed signals three components of input signals to the display;

wherein the luminance component and the chrominance components of the video signals are split into two different paths after the receiving, one of the two different paths comprises a first buffer and connection associating the first buffer with the display, and the other of the two different paths comprises a second buffer and connection associating the second buffer with an output control unit, and the output control unit is included in the device capable of showing OSD and selectively transmits the chrominance components of said video signals or the chrominance components of said OSD signals for display.

15. The method as recited in claim 14, wherein the receiving of the video signals and the OSD signals further comprises:

converting RGB (red green blue) signals of the OSD signals into YUV signals and outputting the YUV signals, if the OSD signals are compliant with the RGB standard.

16. The method as recited in claim 14, wherein the luminance and chrominance components of the video signals and the OSD signals are respectively Y and UV data thereof in YUV standard, further comprising:

combining Y data of the video signals and UV data of the OSD signals to form displayable signals in the YUV standard, and displaying the result of the combining.

17. The method as recited in claim 16, wherein the UV data of the OSD signals is kept from further image processing before being provided to the display.

18. The method as recited in claim 16, wherein the Y data of the video signals is kept from further image processing before being provided to the display.

19. The method as recited in claim 14, wherein the chrominance components of the OSD signals and the entirety of the OSD signals are separately transmitted to a third buffer and a comparator before the replacing.

20. A method for realizing on-screen display (OSD), implemented in a device capable of showing OSD that comprises a video signal receiver, an OSD signal receiver, and an output control unit, comprising:

retrieving by the video signal receiver a first presenting part of video signals to be viewable on a display of the device capable of showing OSD and a second presenting part of said video signals other than said first part, wherein the first presenting part and the second presenting part of said video signals comprise three essential color space elements of the video signals;

retrieving by the OSD signal receiver a second presenting part of on-screen-display (OSD) signals corresponding to said second part of said video signals, wherein a first presenting part and the second presenting part of said OSD signals comprise three essential color space elements of the OSD signals;

selectively transmitting by the output control unit said retrieved second part of said video signals or said retrieved second part of said OSD signals for display; and displaying by the device a set of combinative viewable signals on said display by preparing first and second presenting parts of the set of the combinative viewable signals respectively from said retrieved first part of said video signals and said selectively-transmitted second part of one of said video signals and said OSD signals, wherein the first and second presenting parts of the video signal respectively travel two different routes after retrieval of the first and second presenting parts of the video signal, one of the routes along which the first presenting part of the video signals travels comprises a first buffer and connection associating the first buffer with the display, the other of the two different routes comprises a second buffer and connection associating the second buffer with an output control unit, and the output control unit is included in the device capable of showing OSD and selectively transmits said retrieved second part of said video signals or said retrieved second part of said OSD signals for display.

21. A system for realizing on screen display (OSD) in video signals comprising:
- a video signal receiver for receiving a first presenting part of video signals to be viewable on a display, and a second presenting part of said video signals other than said first part, wherein the first presenting part and the second presenting part of said video signals comprise three essential color space elements of the video signals;
- an OSD signal receiver for receiving a second presenting part of on-screen-display (OSD) signals corresponding to said second part of said video signals, wherein a first presenting part and the second presenting part of said OSD signals comprise three essential color space elements of the OSD signals; and
- an output control unit for selectively transmitting said received second part of said video signals or said received second part of said OSD signals for display and displaying combinative viewable signals on the display by preparing first and second presenting parts of the combinative viewable signals respectively from said received first part of said video signals and said selectively-transmitted second part of one of said video signals and said OSD signals, wherein said retrieved first part of said video signals, said retrieved second part of said video signals and said retrieved second part of said OSD signals are respectively stored in three different buffers before further processing.

22. A system for realizing on screen display (OSD) in video signals, comprising:
- a video signal receiver for receiving video signals with three components, wherein the three components of the video signals comprise one luminance component and two chrominance components;
- an OSD signal receiver for receiving OSD signals with three components, wherein the three components of the OSD signals comprise one luminance component and two chrominance components; and
- an OSD translucency-realizing device retrieving luminance and chrominance components of the video signals and luminance and chrominance components of the OSD signals, replacing the luminance component of the OSD signals by the luminance component of the video signals before the OSD signals are displayed by a display, such that the luminance component of video signals and the chrominance components of the OSD signals collaboratively form three components of processed signals, and outputting by the device the three components of the processed signals as three components of input signals to the display;
- wherein the OSD translucency-realizing device comprises an output control unit that selectively transmits the chrominance components of said video signals or the chrominance components of said OSD signals for display, the luminance component and the chrominance components of the video signals are split into two different paths after the receiving by the video signal receiver, one of the two different paths comprises a first buffer and connection associating the first buffer with the display, and the other of the two different paths comprises a second buffer and connection associating the second buffer with the output control unit.

* * * * *